March 2, 1937. J. TJAARDA 2,072,655
INSTRUMENT PANEL
Filed Jan. 7, 1936
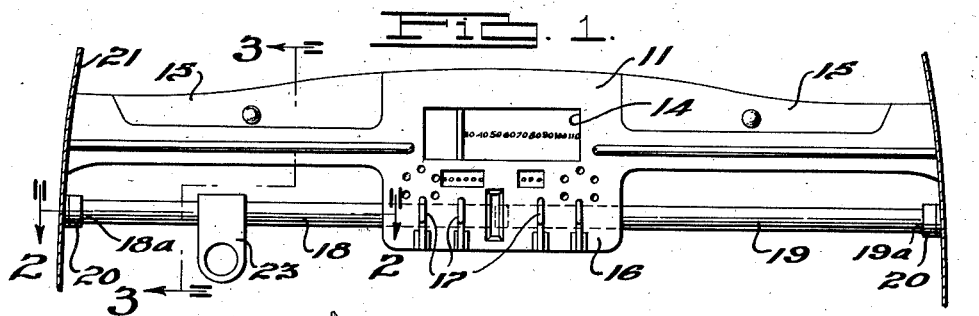
INVENTOR.
John Tjaarda.
BY
Dike, Calver & Gray
ATTORNEYS.

Patented Mar. 2, 1937

2,072,655

UNITED STATES PATENT OFFICE 2,072,655

INSTRUMENT PANEL

John Tjaarda, Birmingham, Mich., assignor to Briggs Manufacturing Company, Detroit, Mich., a corporation of Michigan Application January 7, 1936, Serial No. 57,943

7 Claims. (Cl. 180—90)

This invention relates to automobile or vehicle bodies and more particularly to the instrument or front interior paneling thereof, an object of the invention being to provide an attractive and novel front or instrument panel having means mounted thereon adapted to provide a hand grip or handle bar whereby front seat passengers may assist themselves into and out of their seats.

The present application is a continuation in part of my earlier application Serial No. 697,115, filed November 8, 1933, now Patent No. 2,039,503, dated May 5, 1936.

A further object of the invention is to provide on the front finish or instrument paneling of the body a handle or grip bar or bars located within convenient reach of the front seat passengers when seated in the body as when entering or leaving the same, said bar or bars being formed or positioned directly on the instrument panel.

Other objects and advantages of the invention will appear from the following description and appended claims when considered in connection with the accompanying drawing forming a part of this specification.

Fig. 1 is a front elevation of one form of instrument panel embodying the invention.

Fig. 2 is a section taken substantially along the line 2—2 of Fig. 1, looking in the direction of the arrows.

Fig. 3 is a section taken substantially along the line 3—3 of Fig. 1, looking in the direction of the arrows.

Fig. 4 is a perspective view of a second form of instrument panel embodying the invention.

Fig. 5 is a section taken substantially along the line 5—5 of Fig. 4, looking in the direction of the arrows.

Fig. 6 is a section taken substantially along the line 6—6 of Fig. 5, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the form of the invention shown in Figs. 1 to 3, the instrument panel comprises a body portion 11 having a lower flange 12, and upper flange 13 and an opening 14 for exposing the calibrations, numerals and pointer of a speedometer. The instrument panel is provided with a pair of compartments closed by doors or cover members 15 and with a centrally disposed depending portion or section 16, through the face of which project a plurality of operating levers or buttons 17. It will be noted that the portion 16 extends below the main portion 11 of the panel.

In order to facilitate the movement of occupants of the vehicle into and out of their seats, a pair of tubular handle bars or hand grips 18 and 19 are provided. The outer end 18a, 19a of each handle bar 18, 19 may be secured in a socket 20 fastened to the body panel or frame member 21 of the front end of the body by rivets 22. If desired, the end 18a, 19a of each handle bar 18, 19 may be flattened and bent forward and a bolt or rivet passed through a hole in the flat part to secure it to the frame member. The inner end of each handle bar passes through an opening formed in the side flange 16a of the depending panel 16. In lieu of the two handle bar members 18, 19 a single tubular bar may be employed which extends from one end of the instrument panel to the other and through the pair of alined holes or openings in the side flanges 16ᵃ of the depending panel portion 16. Since the handle bar or bars 18, 19 are spaced from the panel 11, they provide convenient hand grips for the occupants of the vehicle. In this particular form of my invention I propose to mount a bracket 23 upon the left hand bar 18, this bracket providing a support or bearing for the steering column (not shown). Thus I have provided an instrument panel having a hand grip forming a fixed part thereof, which hand grip provides in turn means for supporting the steering column of the automobile.

In the form of the invention shown in Figs. 4 to 6 the instrument panel 31 is asymmetric. The left side of the panel is provided with a pair of openings 32 intended for a clock, a speedometer, and oil and other gauges and instruments and smaller openings 33 for various controls such as the choke and throttle. The center of the instrument panel is provided with an opening 34 intended to receive an ash receptacle or the controls of a radio set and a small opening 35 for the windshield wiper control button. The right side of the panel contains a large rectangular opening giving access to a glove or map compartment and closed by a door 36.

The lower edge of the instrument panel, instead of being straight, has the horizontal part 37 to the right under the door 36 a few inches higher than the horizontal part 38 at the center and to the left under the instruments, the two parts being connected by an ogee shaped curved portion 39. A flange 40 extends along the lower edge 37, 39, 38 of the panel and is reenforced by a bar 41 which fits on top of the flange and is spot welded to it at a suitable number of places.

The reenforcing bar 41 provides adequate local strength for attaching one end of a handle bar 42 which bar extends horizontally below and parallel to the right hand portion 37 of the lower edge of the panel 31. The handle bar is tubular and the left end is cut off at an angle to fit against the sloping part of the flange 40 along the curved part of the lower edge of the panel 31. This end of the bar 42 is filled with a plug 43 which receives the end of a screw 44 by which that end of the handle bar is fastened to the flange 40 and to the reenforcing bar 41. A rubber gasket 45 between the end of the handle bar and the flange 40 prevents chipping or marring of the finish on the flange 40.

The right end of the handle bar fits into a socket 46, similar to the sockets 20 used in the first form of the invention, which is secured to the side of the body in any suitable manner and which, in the actual car, is covered by the body trim.

It will be seen that I have provided, in this second form of the invention, a modern, attractive instrument panel provided with a horizontal bar to assist passengers in getting into and out of their seats and which may also be used to hold a lap robe within easy reach of the passengers in the front seat.

I claim:

1. In an automobile body, a front end including a side support, an instrument panel comprising a transverse body having a depending portion, and a handle bar extending horizontally from the side support to the depending portion and spaced below said body portion to provide a hand grip.

2. In an automobile body, an instrument panel comprising a transverse body having a depending portion, and a handle bar projecting from said depending portion and extending horizontally below the body portion of the panel, the handle bar being spaced below the body portion of the panel to provide a hand grip.

3. In an automobile body, an instrument panel having a portion of its bottom edge lower than the adjacent horizontal portion of the bottom edge, and a handle bar extending below and parallel to said horizontal portion of the bottom edge and secured to the portion of the bottom edge between said horizontal portion and said lower portion.

4. In an automobile body, a transverse instrument panel having its lower edge formed into a flange having two laterally spaced vertically offset horizontal portions joined by a connecting portion, and a handle bar extending under the higher of the two horizontal portions of the flange and having one end fixed to the connecting portion of the flange.

5. In an automobile body, a transverse sheet metal instrument panel having its lower edge formed into a flange having two laterally spaced vertically offset horizontal portions joined by a connecting portion, a steel reenforcing member extending along on top of and secure to the flange, a handle bar extending under the higher of the two horizontal portions of the flange and having one end butting against the connecting portion of the flange, and means to secure the end of the handle bar to the flange and the reenforcing means.

6. In an automobile body, a transverse sheet metal instrument panel having its lower edge formed into a flange having two laterally spaced vertically offset horizontal portions joined by a connecting portion, a steel reenforcing member extending along on top of and secured to the flange, a tubular handle bar extending under the higher of the two horizontal portions of the flange and having a plugged end fitting against the connecting portion of the flange, a soft washer between the flange and the plugged end of the handle, and a screw extending through the reenforcing member and the flange into the plugged end of the handle bar.

7. In an automobile body, a front end including a side support, an instrument panel comprising a transverse body having a depending portion, a bar extending horizontally from the side support to the depending portion and spaced below said body portion, and a bracket mounted on said bar and adapted to hold a steering column.

JOHN TJAARDA